(12) United States Patent  
Proteau et al.

(10) Patent No.: US 7,177,464 B2  
(45) Date of Patent: Feb. 13, 2007

(54) SYSTEM AND METHOD FOR APPROXIMATING PIXEL COLOR UTILIZING AN OPTIMIZED OCTREE

(75) Inventors: Stephen P. Proteau, Bothell, WA (US); Jingyang Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 10/464,155

(22) Filed: Jun. 17, 2003

(65) Prior Publication Data

US 2004/0258299 A1    Dec. 23, 2004

(51) Int. Cl.
*G06K 9/00* (2006.01)
*G06F 13/00* (2006.01)

(52) U.S. Cl. .................................... 382/165

(58) Field of Classification Search ................ 382/162, 382/164, 165, 167, 172; 345/152, 153, 589, 345/591, 593, 600–604; 358/515, 518, 520, 358/526
See application file for complete search history.

(56) References Cited

U.S. PATENT DOCUMENTS 5,745,103 A * 4/1998 Smith .......................... 345/601
6,326,977 B1 * 12/2001 Westerman .................. 345/591
6,373,462 B1 * 4/2002 Pan et al. ..................... 345/600
7,050,064 B2 * 5/2006 Pan et al. ..................... 345/591

* cited by examiner

*Primary Examiner*—Amir Alavi
(74) *Attorney, Agent, or Firm*—Christensen O'Connor Johnson Kindness PLLC

(57) ABSTRACT

A method for approximating pixel colors in a display utilizing anoptimized color palette is provided. A color octree of a target display is generated by mapping the RGB color information from each pixel into the color octree. Each is generated such that each node of the octree tracks pixel count and color information. If the number of leaf nodes exceeds the target number of colors for the color palette, the octree is pruned by a recursive algorithm that compares a merging threshold to the number of pixels represented by each node and the number of unique colors represented by the node with a unique color lock threshold. The merging threshold and the unique color lock threshold are adjusted until the number of leaf nodes is less than the target number of colors in the color palette. Each pixel in the original display can be mapped to the color palette to reproduce the display.

36 Claims, 12 Drawing Sheets

SYSTEM AND METHOD FOR APPROXIMATING PIXEL COLOR UTILIZING AN OPTIMIZED OCTREE

FIELD OF THE INVENTION

In general, the present invention relates to computer software, and in particular, to a system and method for approximating pixel colors utilizing color octree optimization.

BACKGROUND OF THE INVENTION

Generally described, computing devices can be utilized to display images to computer users on a display screen. To generate various images, the typical computer display is made up of a grid of equal-sized blocks generally referred to as pixels. For example, a display screen may be made up of a grid of 1024 pixels in width and 820 pixels in height. To generate color images on the display, each pixel within the display screen can be individually controlled by a computer such that each pixel can be given a unique color. Accordingly, one skilled in the relevant art will appreciate that the resolution of displayed color images depends greatly on the number of pixels in the display screen and the palette of colors available for each pixel.

In one common embodiment, a pixel color is achieved by combining red, green and blue characteristics to generate a particular color. More specifically, each pixel is assigned a particular red value, green value and blue value, which are generated by the display screen to form a resulting color for the pixel. The specification of the three-color value is typically referred to as the red, green and blue value, or RGB value, of the pixel. One skilled in the relevant art will appreciate that the number of potential red, green and blue values for a pixel is dependent entirely on the amount of data utilized to specify the data. For example, if 8-bits are used to represent each color value in a binary representation (e.g., 8-bit red value, 8-bit green value, and 8-bit blue value), there would be would be $2^8$, or 256, possibilities for each color value. Based on an 8-bit representation, there would be more than 16 million possible RGB combinations (256 red×256 green×256 blue). Accordingly, screen display color resolution benefit greatly, in terms of total possible colors, from representing pixel color attributes utilizing at least 8 bits per color value.

Although representing pixel color attributes utilizing 8-bits per color value results in improved color, there are a number of environments in which limited data transfer bandwidth may effect the ability to specify the full range of possible colors. For example, in a communication network environment, such as the Internet, the performance of data delivery, such as the delivery of a Web page, is optimized by limiting the amount of data transmitted over network. Further, there are a number of environments in which image storage and rendering is optimized by limiting the size of the image file. In an environment utilizing 8-bit RGB values, the transfer and/or storage of 24-bits of data per pixel results in more than 20 million bits of data per page of display for a 1024 by 820 pixel display screen. Accordingly, there is an emphasis to improve computer performance by approximating color data for each pixel with a lesser amount of data while mitigating the potential color degradation associated with the lesser data. For example, the ability to represent the RGB value with 8 total bits instead of 24 total bits could reduce the amount of data transferred by a factor of three.

One attempt to approximate 24-bit RGB pixel color values relates to mapping of a subset of the 24-bit color representations into a selective color palette that will be applied to individual pixels. For example, if the selective color palette is limited to a selective 256 total colors, each pixel's color values can be approximated by only 8 bits. In some embodiments, the 256 colors are preselected to cover a wide range of possible color values. Although the preselected color palette approach is easy to implement and does not require an approximation of each individual color display, one skilled in the relevant art will appreciate the selection of the 256 most applicable colors from 16 million possible colors can vary greatly for each display. Accordingly, a pre-selected 256-color palette approximation yields potentially unsatisfactory results in some displays. For example, in a color display utilizing a number of shades of particular color, a pre-selected color palette would likely not be able to yield adequate results.

Another embodiment related to generating a selective color palette relates to the a dynamic selection of a selective color palette corresponding to the frequency of the appearance of colors within a particular display, referred to generally as an optimized color palette. An optimized color palette allows pixel color to be represented from a lesser amount of data (e.g., 8-bits), while allowing the selection of the color palette to correspond more closely to the colors appearing in a display. One well-known method for optimizing a color palette utilizing octree is referred to generally as the Gervautz and Purgthofer octree method. Although the Gervautz and Purgthofer method will be described generally below, one skilled in the relevant art will have a detailed understanding of the method.

Generally described, the Gervautz and Purgthofer method corresponds to graphing each pixel's RGB color values into a hierarchical tree structure. In an 8-bit RGB model, each pixel's RGB color value is mapped into hierarchically structure that includes a number of hierarchically arranged 8-bit arrays, or octree arrays. Each level of the octree represents a 3-bit index corresponding to the merging of a bit from red, green and blue color values. For example, the first 3-bit index value corresponds to the merging of the most significant bits of the red, green and blue colors. Each octree array element corresponds to a potential value of the three-bit index. Furthermore, each octree array element keeps a running total of the number of pixels that match the array elements designated value and a cumulative RGB value of each matching pixel. Although the hierarchical structure may include as many levels as there are bits in the data being mapped (e.g., 8 levels for 8-bit color representation), one skilled in the relevant art will appreciate that a lesser number of levels may be used and that the least significant bits may be ignored altogether.

Starting with a base octree array corresponding to the most significant RGB pixel color values, each octree array element can link to another level octree array representing the next most least significant bit in the RGB color value. Accordingly, the base octree array can link to eight different second level octree arrays. Similarly, each of the eight-second level octree arrays can link to eight third level arrays for a total of 64 octree arrays. Once all of bits of the RGB value are mapped, or a lesser number of bits are selected to be mapped, the set of octree arrays in the lowest level are considered the leaf nodes of the octree and represent each of the unique colors found within the display. One skilled in the art will appreciate that each array element to the base octree array, corresponding to the most significant bits of the RGB values, define distinctive color branches of the octree. Each successive octree array is representative of different shades of a color branch associated with the octree. Accordingly, the differences between the lowest octree arrays represent more refined shades of the color branches.

FIG. 1 is a block diagram illustrative of a mapping of a pixel RGB value into a hierarchical tree structure in accordance with the Gervautz and Purgthofer method. Table 100 represents a single pixel's 8-bit RGB value denoted by rows 102, 104, and 106 respectively. Row 108 corresponds to a three-digit combination of each bit place of the RGB value, with the most significant bit on the left.

In accordance with the Gervautz and Purgthofer method, each bit place value in row 108 corresponds to the value tracked within a hierarchical octree from most significant bit to least significant bit, respectively. As illustrated in FIG. 1, because the most significant bit value in row 108 corresponds to the binary representation of the numeral "3," the value of the array element in octree array 110 is incremented by one. Similarly, because the second most significant bit value in row 108 corresponds to the binary representation of the number "6," the array element in octree array 112 is incremented by one. Note that array element 112 is linked to the previous tracked array element in array 110. For purposes of illustration, octree arrays 114, 116 and 118 are populated according to the next three most significant bits of row 108. Accordingly, the array elements of array element 118 (on the fifth level) are considered the leaf nodes of the octree. However, one skilled in the relevant art will understand that three additional octree arrays could be populated (now shown).

In accordance with the Gervautz and Purgthofer method, the generation of the optimized color palette corresponds to a mapping of the unique colors in the color octree to the palette. In the simplest embodiment, if the number of leaf nodes does not exceed, or matches, the number of colors available in the color palette, each of the unique colors represented by the leaf node is mapped to the color palette and the method terminates. However, in many embodiments, the number of unique colors exceeds the number of available colors in the palette and the number of unique colors must be reduced. In accordance with the Gervautz and Purgthofer method, to reduce the number of leaf nodes, one or more leaf nodes are merged up one level within the same parent node. The merger results in the parent node becoming the new leaf node and reduces the number of overall leaf nodes in the color octree. This process is generally referred to as trimming or pruning. The trimming continues until the number the leaf nodes equals the number of available colors in the optimized color palette.

In accordance with the Gervautz and Purgthofer method, the selection of which leaf nodes to trim relates to reducing the leaf nodes containing the fewest pixel counts. More specifically, the method identifies which leaf node octree array elements is tracking the lowest number of pixels and merges the leaf node octree array with the closest proximate octree array element having a common parent node. The merger results in a higher-level octree array becoming the leaf node and including pixel information for the two merged arrays corresponding to an average of the pixel information. The process continues merging the lowest pixel count leaf nodes until the number of octree leaf nodes is reduced to the target number of leaf nodes.

FIG. 2 is a block diagram illustrative of an octree 200 that has been mapped in accordance with the Gervautz and Purgthofer method. The octree can include a number of levels of octree arrays, including octree arrays 202, 204 and 206, in which octree array 206 corresponds to a leaf node array. Octree array 206 includes a third array element 208 that includes pixel tracking information 212 of 2 pixels and the cumulative RGB information for the two pixels. Likewise, the octree array 206 includes a seventh array element 210 that includes pixel tracking information 214 of 1 pixel with it cumulative RGB information. Assuming that the pixel array element 210 is the lowest leaf node within the octree, in accordance with the Gervautz and Purgthofer method, array element 208 and array element 210 are merged up one level to form a new leaf node including all the pixel information.

FIG. 3 is a block diagram of the octree 200 of FIG. 2 illustrating the resulting merger of two array elements. As illustrated in FIG. 3, array elements 208 and 210 of array 206 have been merged into array element 216 of array 204. Accordingly, array element 216 becomes a new leaf node of the octree and includes pixel-tracking information 218 corresponding to the cumulative RGB values of the previously merged array elements. The pixel tracking information 218 is then utilized to generate an averaged RGB values for the pixels previously found in each array.

Although the Gervautz and Purgthofer method provides a manner in which to optimize a selective color palette according to the colors found in particular display, the method can yield unsatisfactory results if applied to displays utilizing a greater number of pixels of one primary color and fewer pixels of another primary colors. For example, assume a display corresponds to a large number of pixels predominantly correspond to various shades of red. Further, assume that a limited number of pixels that corresponds to a single shade of yellow. Clearly, the limited yellow pixels would be important as contrast to the number of other red pixels. However, in accordance with the Gervautz and Purgthofer method, the leaf node representative of yellow would be trimmed and eventually merged with the red pixel color branches because the yellow leaf nodes would have a relatively low pixel tracking count. Accordingly, the optimized color palette would not include the appropriate shade of yellow and the contrast of the display would be lost. Accordingly, an approximation of the display would be inadequate.

Thus, there is a need for a color palette optimization method that preserves distinctive colors during the optimization process.

SUMMARY OF THE INVENTION

A method for approximating pixel colors in a display utilizing an optimized color palette is provided. A color octree of a target display is generated by mapping the RGB color information from each pixel into the color octree. Each node of the octree tracks the number of pixels passing through the node, the cumulative RGB color values for a number of pixels, and the number of unique color branches below the node. If the number of leaf nodes exceeds the target number of colors for the color palette, the octree is pruned by a recursive algorithm that compares a merging threshold to the number of pixels represented by each node and the number of unique colors represented by the node with a unique color lock threshold. The merging threshold and the unique color lock threshold are adjusted until the number of leaf nodes is less than the target number of colors in the color palette. Each pixel in the original display can be mapped to the color palette to reproduce the display.

In accordance with an aspect of the invention, a method for generating an optimized color palette having a target number of colors for a display is provided. The display corresponds to a specification of color values for a plurality of pixels. Each pixel has a specific color value. In accordance with the method, a computing device obtains a color octree corresponding to a mapping of pixel color values. The color octree includes a plurality of leaf nodes that track a cumulative color value for a plurality of pixels in the display. The color octree also includes unique color lock thresholds correspond to various levels of the color octree. For each node in the color octree having all children that are leaf nodes, the computing device determines whether the number of pixels tracked by a current node is less than a merging threshold. If the number of pixels tracked by the current node is less than a merging threshold, the computing device then determines whether a number of unique colors represented by the current node is greater than a unique color lock threshold. If the number of unique colors represented by the current node is greater than the unique color lock threshold, the computing device merges all the child leaf nodes into the current node. For each node in the color octree having at least one child that is a leaf node, the computing device determines whether the number of pixels tracked by each leaf node child is less than a merging threshold. If the number of pixels tracked by the leaf node child is less than a merging threshold, the computing device then determines whether a number of unique colors represented by the leaf node child is greater than a unique color lock threshold. If the number of unique colors represented by the current node is greater than the unique color lock threshold, the computing device merges the leaf node child into a sibling node. The computing device repeats these actions until the number of leaf nodes is less than the target number of colors in the optimized color palette. Once the number of leaf nodes is less than or equal to the target number of colors in the optimized color palette, the computing device generates a color palette corresponding to a mapping each remaining leaf node color value.

In accordance with another aspect of the present invention, a method for processing content requests is provided. In accordance with the method, a computing device obtains a content request including a request for display data corresponding to a specification of color values for a plurality of pixels. Each pixel has a specific color value. The computing device generates generating a color octree corresponding to a mapping of pixel color values. The color octree includes a plurality of leaf nodes that track a cumulative color value for a plurality of pixels in the display. The color octree also includes unique color lock thresholds corresponding to various levels of the color octree. For each node in the color octree having all children that are leaf nodes, the computing device determines whether the number of pixels tracked by a current node is less than a merging threshold. If the number of pixels tracked by the current node is less than a merging threshold, the computing device then determines whether a number of unique colors represented by the current node is greater than a unique color lock threshold. If the number of unique colors represented by the current node is greater than unique color lock threshold, the computing device merges all the child leaf nodes into the current node. For each node in the color octree having at least one child that is a leaf node, the computing device determines whether the number of pixels tracked by a leaf node child is less than a merging threshold. If the number of pixels tracked by the leaf node child is less than a merging threshold, the computing device then determines whether a number of unique colors represented by the leaf node child is greater than a unique color lock threshold. If the number of unique colors represented by the current node is greater than the unique color lock threshold, the computing device merges the leaf node child into a sibling node. The computing device repeats these actions until the number of leaf nodes is less than the target number of colors in the optimized color palette. Once the number of leaf nodes is less than or equal to the target number of colors in the optimized color palette, the computing device generates a color palette corresponding to a mapping each remaining leaf node color value. For each pixel in the display, the computing device maps the original pixel color value to a color value in the color palette. Additionally, the computing device transmits the color palette and the mapped color display information in response to the content request.

In accordance with a further aspect of the present invention, a method for generating an optimized color palette having a target number of colors for a display is provided. The display corresponds to a specification of color values for a plurality of pixels. Each pixel has a specific color value. In accordance with the method, a computing device generates a color octree corresponding to a mapping of pixel color values. The color octree includes a plurality of leaf nodes tracking a cumulative color value for a plurality of pixels in the display. Each leaf node includes a unique color lock threshold corresponding to its position within the color octree. For each node in the color octree having children that are all leaf nodes, the computing device determines whether the number of pixels tracked by a current node is less than a merging threshold. If a number of pixels tracked by the current node is less than a merging threshold, the computing device determines whether a number of unique colors represented by the current node is greater than a unique color lock threshold. If the number of unique colors represented by the current node is greater than the unique color lock threshold, the computing device merges all the child leaf nodes into the current node. For each node in the color octree having at least one child that is a leaf node, the computing device determines whether the number of pixels tracked by a leaf node child is less than a merging threshold. If the number of pixels tracked by the leaf node child is less than a merging threshold, the computing device then determines whether a number of unique colors represented by the leaf node child is greater than a unique color lock threshold. If the number of unique colors represented by the current node is greater than the unique color lock threshold, the computing device merges the leaf node child into a sibling node. If the number of remaining leaf nodes is greater than the target number of colors in the optimized color palette and the number of leaf nodes has not changed, the computing device increases the merging threshold and a merging threshold count and repeats these actions until the merging threshold count is greater than a count threshold. Then, the computing device adjusts the unique color lock threshold and resets the merging threshold. Additionally, if the number of leaf nodes is less than or equal to the target number of colors in the optimized color palette, generating a color palette corresponding to a mapping each remaining leaf node color value.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF AN ILLUSTRATIVE EMBODIMENT

Generally described, the present invention relates to a system and method for optimizing a color palette for approximating pixel color in displays. More specifically, the present invention relates to a system and method for optimizing a color palette for approximating pixel colors by preserving distinct colors during the optimization process. Although the present invention may be described with regard to illustrative threshold values and/or operating environments, one skilled in the relevant art will appreciate that these embodiments should not be construed as limiting. Prior to discussing the present invention in greater detail, a suitable computing system for implementing the present invention will be described.

Figure 12:
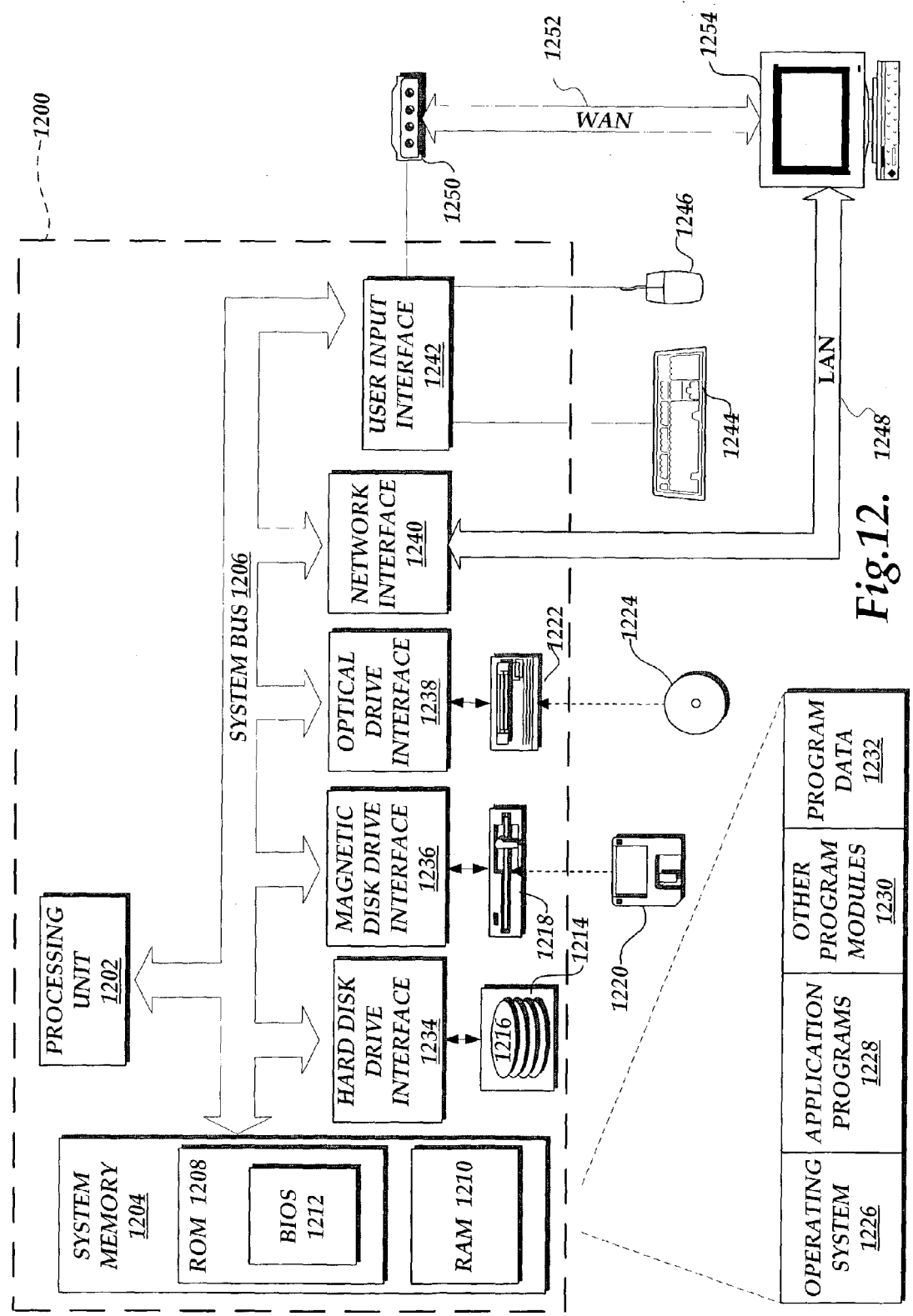
FIG. 12 is a block diagram illustrative of a computer system suitable to implement various aspects of the present invention.

FIG. 12 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 1200. Components of a computer 1200 include, but are not limited to, a processing unit 1202, a system memory 1204, and a system bus 1206 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 1200 typically includes a variety of computer-readable media. Computer-readable media can be any available media that can be accessed by the computer 1200 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1200.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1204 includes computer storage media in the form of volatile and/or non-volatile memory such as read only memory (ROM) 1208 and random access memory (RAM) 1210. A basic input/output system 1212 (BIOS), containing the basic routines that help to transfer information between elements within the computer 1200, such as during start-up, is typically stored in ROM 1208. RAM 1210 typically contains data and/or program modules that are immediately accessible to and/or presently being operated on by the processing unit 1202. By way of example, and not limitation, FIG. 12 illustrates an operating system 1226, application programs 1228, other program modules 1230, and program data 1232.

The computer 1200 may also include removable/non-removable, volatile/non-volatile computer storage media. By way of example only, FIG. 12 illustrates a hard disk drive 1214 that reads from or writes to non-removable, non-volatile magnetic media 1216, a magnetic drive 1218 that reads from or writes to a removable, non-volatile magnetic disk 1220, and an optical disk drive 1222 that reads from or writes to a removable, non-volatile optical disk 1224, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 1214, magnetic disk drive 1218, and optical disk drive 1222 may be connected to the system bus 1206 by a hard disk drive interface 1234, a magnetic disk drive interface 1236, and an optical drive interface 1238, respectively. Alternatively, the hard disk drive 1214, magnetic disk drive 1218, and optical disk drive 1222 are typically connected to the system bus 1206 by a Small Computer System Interface (SCSI).

The drives and their associated computer storage media discussed above and illustrated in FIG. 12, provide storage of computer-readable instructions, data structures, program modules and other data for the computer 1200. In FIG. 12, for example, the hard disk drive 1234 is illustrated as storing the operating system 1226, application programs 1228, other programs 1230, and program data 1232. Note that these components can either be the same as or different from the operating system 1226, the other program modules 1230, and the program data 1232. A user may enter commands and information into the computer 1200 through an input device such as a keyboard 1244 and/or a pointing device 1246, commonly referred to as a mouse, track ball or touch pad. Other input devices (not shown) may include a microphone, a joystick, a game pad, a satellite dish, a scanner, or the like. These and other input devices are often connected to the processing unit 1202 through user input interface 1242 and may be connected by other interface and bus structures, such as a parallel port, game port or other universal serial bus (USB).

The computer 1200 may operate in a network environment using logical connections to one or more remote computers 1254. The remote computer 1254 may be a personal computer, a server, a router, a network PC, a peer device or other common network node, and typically includes many or all of the elements described above relative to the computer 1200, although only a memory storage device has been illustrated in FIG. 12. The logical connections depicted in FIG. 12 include a local area network (LAN) 1248 and a wide area network (WAN) 1252, but also include other networks. Such network environments are commonplace in office, enterprise-wide computer networks, Intranets, and the Internet.

When used in a LAN network environment, the computer 1200 is connected to the LAN 1248 through a network interface adapter 1240. When used in a WAN network environment, the computer typically includes a modem 1250 or other means for establishing communications over the WAN 1252, such as the Internet. The modem, which may be internal or external, may be connected to the system bus 1206 via the serial port interface or other appropriate mechanism. In a networked environment, program modules depicted relative to the computer 1200, or portions thereof, may be stored in the remote memory storage device. By way of example, and not limitation, FIG. 12 illustrates remote application programs 1228 as residing on memory device 1204. It will be appreciated that the network connections shown are exemplary and other means of establishing communication between the computers may be used. Although many other internal components of the computer 1200 are not shown, those of ordinary skill will appreciate that such components and their interconnection are well known. Accordingly, additional details concerning the internal construction of the computer 1200 need not be disclosed in connection with the present invention.

Those skilled in the art will understand that program modules such as the operating system 1226, the application programs 1228 and data 1232 are provided to the computer 1200 via one of its memory storage devices, which may include ROM 1208, RAM 1210, hard disk drive 1214, magnetic disk drive 1218, or optical disk device 1222. The hard disk drive 1214 is used to store data 1232 and the programs, including the operating system 1226 and application programs 1228.

When the computer 1200 is turned on or reset, the BIOS 1212, which is stored in ROM 1208 instructs the processing unit 1202 to load the operating system 1226 from the hard disk drive 1214 into the RAM 1210. Once the operating system 1226 is loaded into RAM 1210, the processing unit executes the operating system code and causes the visual elements associated with the user interface of the operating system to be displayed on the monitor. When a user opens an application program 1228, the program code and relevant data are read from the hard disk drive and stored in RAM 1210.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communication device, modem and temporary telephone, or a wireless link.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer®, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

As described above, the present invention corresponds to the generation a color palette utilizing a color octree optimization method. The optimized color palette can reduce the data required to specify pixel color values in a display by approximating all pixel colors to a color in the optimized color palette. Generally described, the present invention utilizes a similar approach to the Gervautz and Purgthofer method in utilizing a color octree to represent unique colors within a display. However, the present invention utilizes additional methodologies to preserve distinct color integrities during the optimization process. Although the present invention will be described with regard to an 8-bit color palette having 256 unique colors, the present invention may be applied to any size color palette.

Figure 1:
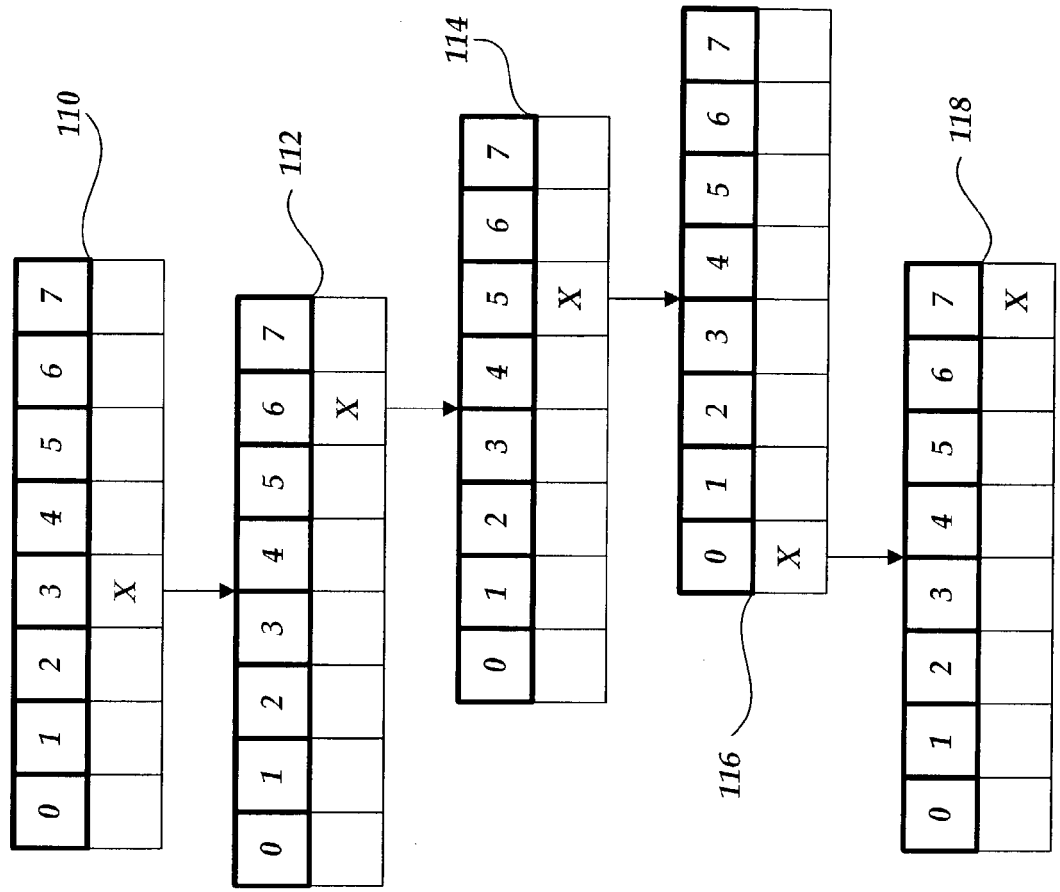
FIG. 1 is a block diagram illustrative of a mapping of pixel RGB values into a hierarchical octree structure in accordance with the Gervautz and Purgthofer method.
Figure 1:
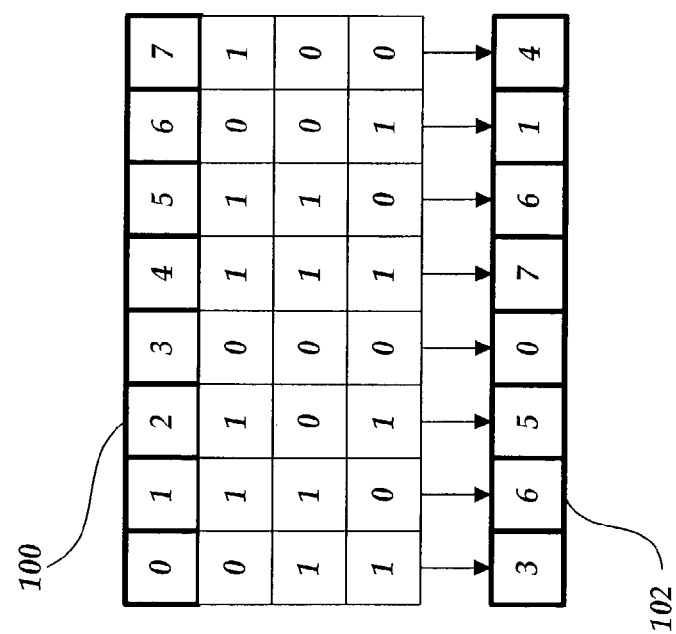
Figure 2:
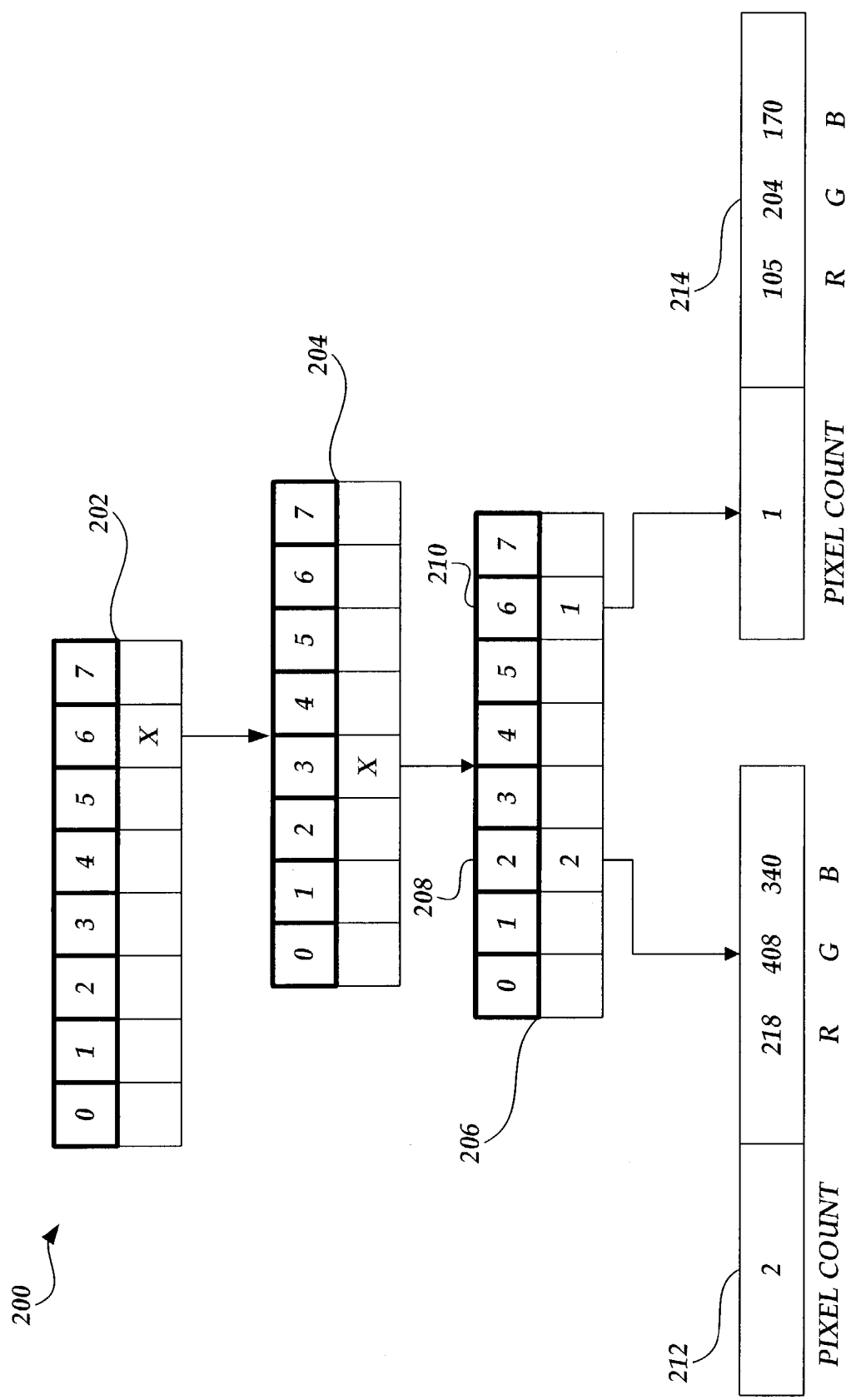
FIG. 2 is a block diagram illustrative of an octree that has been mapped in accordance with the Gervautz and Purgthofer method.
Figure 3:
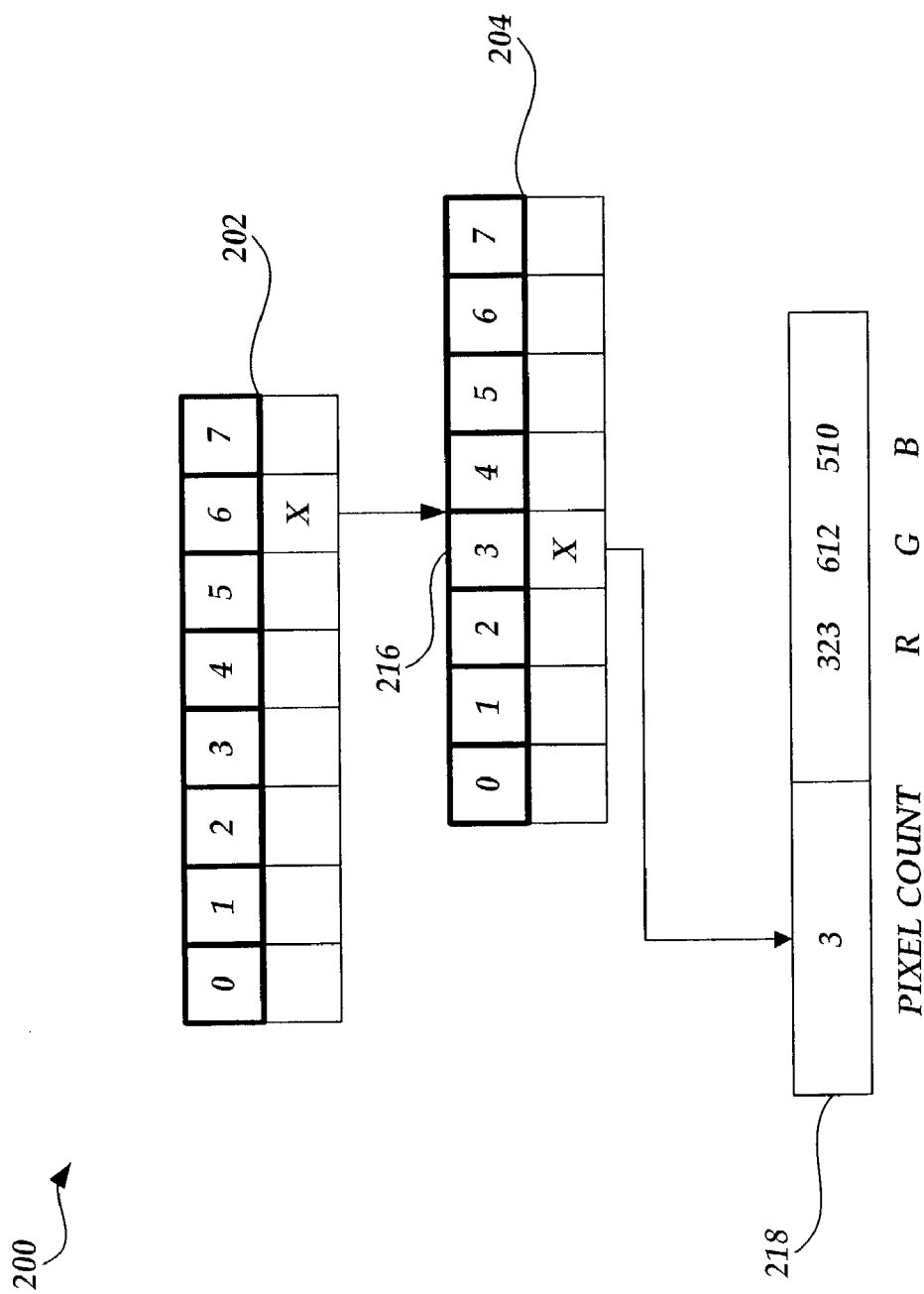
FIG. 3 is a block diagram of the octree of FIG. 2 illustrating the resulting merger of two array elements;]
Figure 4:
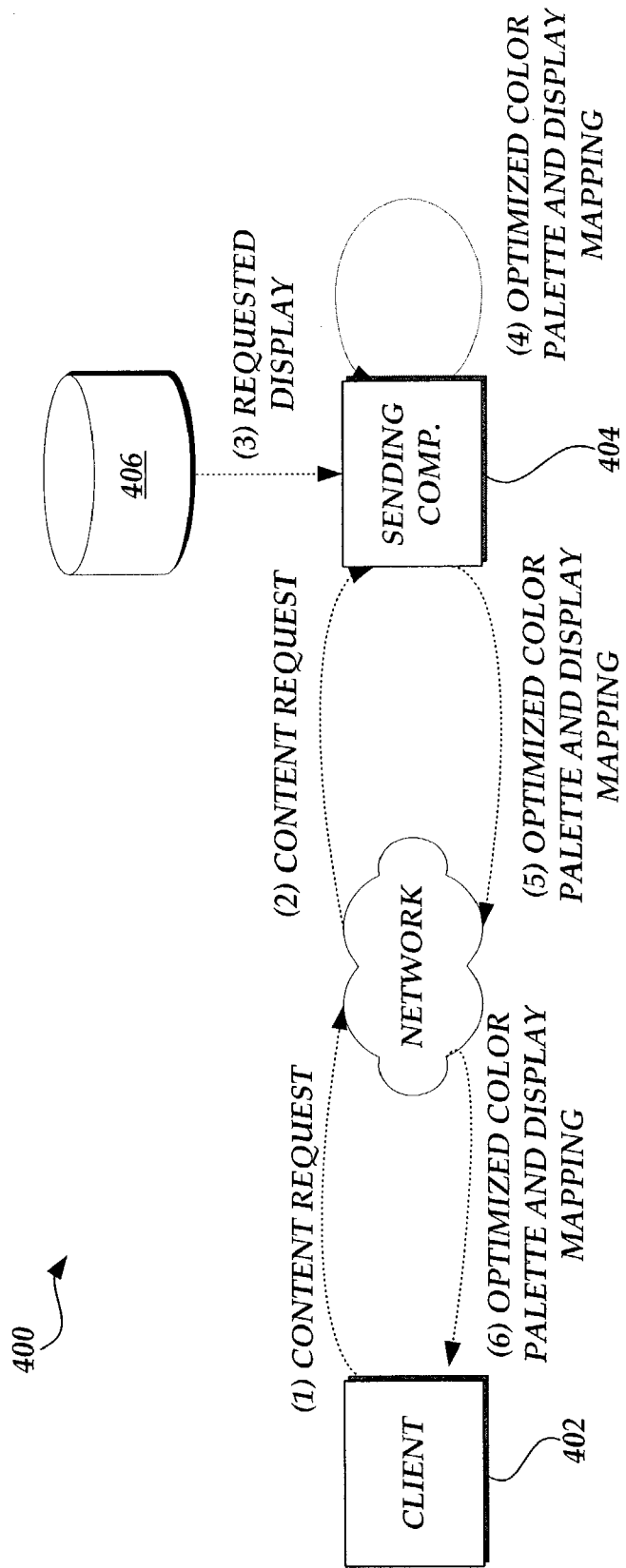
FIG. 4 is a block diagram illustrative of a system for processing content requests utilizing an optimized color palette in accordance with the present invention.

FIG. 4 is a block diagram illustrative of a system 400 for processing images utilizing an optimized color palette. As illustrated in FIG. 4, a client computing device 402 requests information from a sending computer 404 over a communication network. The sending computer identifies and obtains the requested content from memory or a database 406. The sending computer 404 then generates an optimized color palette for the display images in the requested content. The sending computer 404 associates each pixel's original color to one of the colors in the optimized color palette. The sending computer 404 then transmits the color palette and the associated mapping information to the client computing device 402. The client computing device 402 then reproduces then reproduces the requested images according to the optimized color palette. Alternatively, the present invention may be utilized in a manner such that the client computing device 402 utilizes an optimized color palette to store previously uncompressed image files in memory. Additionally, the present invention may be utilized in a manner such that the client computing device 402utilizes an optimized color palette to reprocess image files previously compressed with different optimization methods.

Figure 5A:
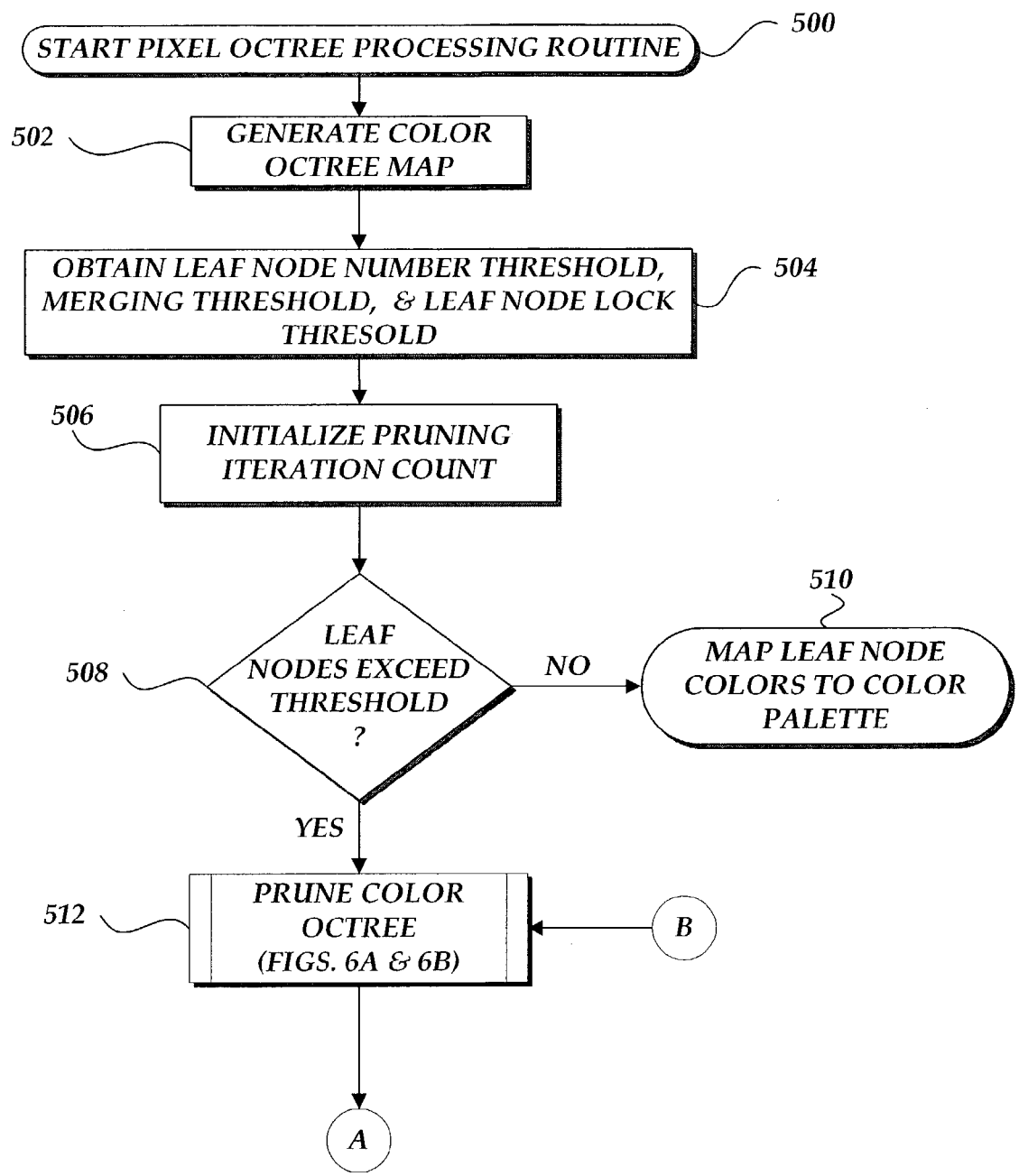
FIGS. 5A and 5B are flow diagrams illustrative of a color octree processing routine utilized to generate an optimized color palette in accordance with the present invention.
Figure 5B:
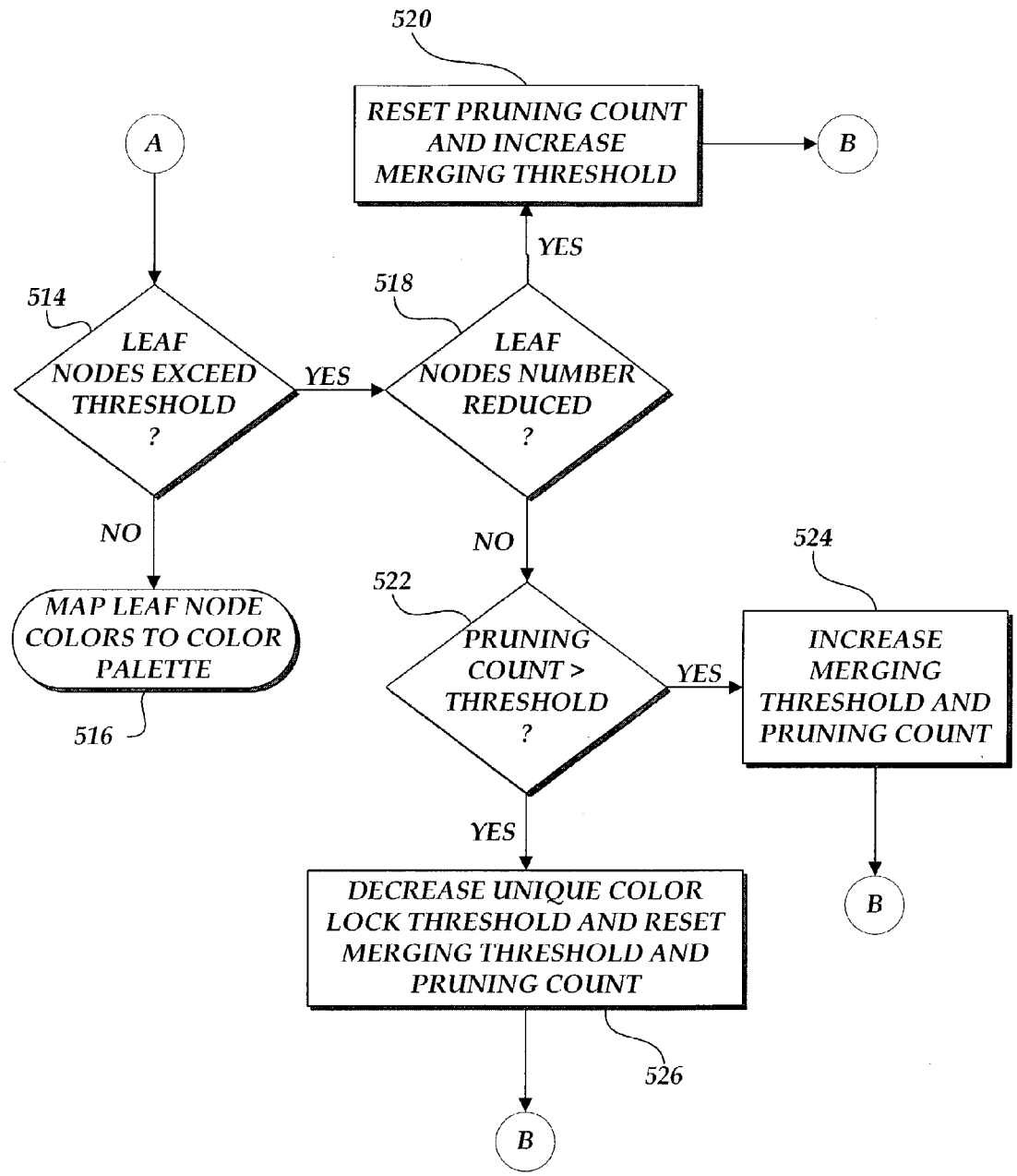

FIGS. 5A and 5B are flow diagrams illustrative of a pixel octree processing routine 500 utilized to generate an optimized color palette in accordance with the present invention. With reference to FIG. 5A, at block 502, a pixel octree map is generated. As described above, the pixel octree map corresponds to the mapping of each individual pixel RGB values in a multi-level hierarchical octree. In one embodiment, the octree includes nine levels corresponding to the number of bits utilized to specify the RGB value of each pixel. Alternatively, the octree can include a lesser number of levels corresponding to an approximation of the lesser significant bits of the RGB values.

In an illustrative embodiment of the present invention, each node in the octree tracks the number of pixels passing through the node, the number of unique colors passing through the node and the cumulative RGB values for each of the pixels passing through the node. In one embodiment, the values tracked by each node correspond to the actual number of pixels passing through the node, the actual number of unique color passing through the node and actual cumulative RGB values for each of the pixels passing through the node. In another embodiment, additional criteria may be utilized to adjust the values tracked in each node according to a weighting schema. In one aspect, transparency values of each pixel can be used as a weighting function for the values tracked at each node. For example, a pixel transparency value corresponding to an opaque image would correspond to a value of "1", while a transparency value corresponding to transparency would correspond to "0". By multiplying each pixel's transparency value with its count number, opaque pixel values would have a greater impact on the count than transparent pixel values. For example, for a pixel of 50% transparency, the cumulative RGB value would only increase by 0.5*R, 0.5*G, 0.5*B and the cumulative count of pixels would only increase by 0.5. In another aspect, pixel location may be utilized as a weighting function for the values tracked at each node. For example, a pixel located on a center part of an image may be associated with a heavier weight that pixel on a periphery on an image. In still another aspect, each individual pixel may be assigned a weighting function based on input from the creator of the image or based upon display attributes of a device. For example, to facilitate facial recognition in images, pixels corresponding to the representation of a face may be given higher weight.

At block 504, a leaf node number threshold, leaf unique color lock threshold and merging threshold is obtained. The leaf node number threshold corresponds to the number of unique colors that may be included in the optimized color palette. For example, in an 8-bit color palette, 256 unique colors may be used. Accordingly, the leaf node number threshold could be set to 256. Alternatively, in an illustrative embodiment of the present invention, a portion of the colors may be pre-designated or reserved, thereby limiting the number of colors that can be added to the color palette. The unique color lock threshold corresponds to a number utilized to preserve distinct colors during the optimization process and serves as an secondary threshold that must be satisfied prior to merging leaf nodes. In accordance with an embodiment of the present invention, each level in the octree corresponds to a particular unique color lock threshold. In one embodiment, the unique color lock threshold may be fixed number. In another embodiment of the present invention, the unique color lock threshold can be dynamically modified based upon a mathematical evaluation of a color lock variable. The unique color lock threshold will be described in greater detail below. The merging threshold corresponds to the minimum number of pixels that a particular color leaf node should represent to avoid being merged with an adjacent node in the octree. As will be explained in greater detail below, the merging threshold corresponds to a number utilized to identify the minimum number of pixels that a leaf node may have to be pruned. In an illustrative embodiment of the present invention, the merging threshold is a dynamic number that is increased during iterations of routine 500.

At block 506, the pruning iteration count and the merging threshold are initialized. As will be described in greater detail below, the pruning iteration count corresponds to a number for tracking the number of times the octree has been pruned with the current unique color lock threshold. The pruning iteration count is used to determine when to adjust the unique color lock threshold.

At block 508, a test is conducted to determine whether the current number of leaf nodes in the octree exceeds the leaf node number threshold. If the leaf node number threshold is not exceeded, the unique leaf node colors can be mapped to the color palette at block 510 and the routine terminates. Alternatively, if the leaf node number threshold is exceeded, the pixel octree is pruned at block 512.

Figure 6A:
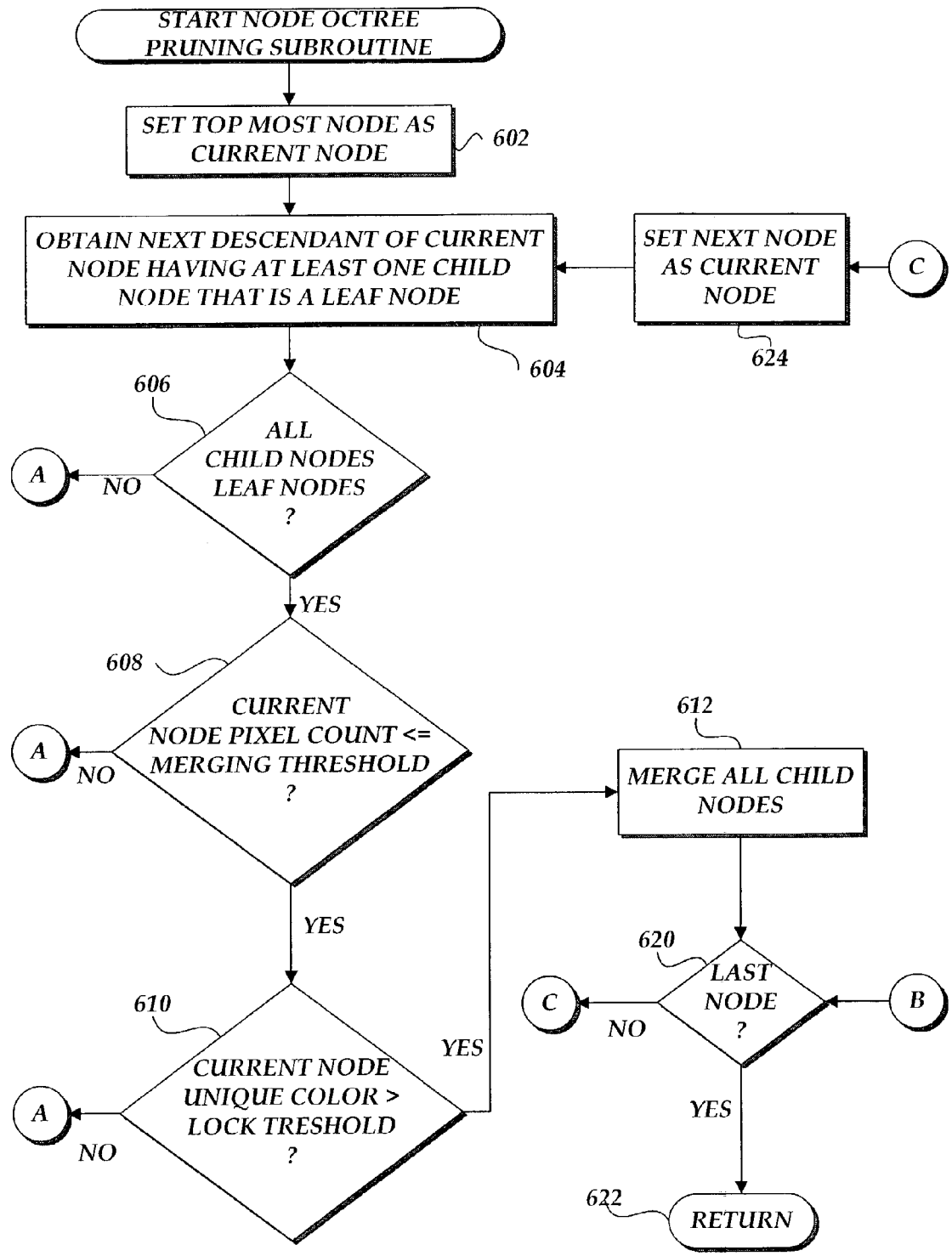
FIGS. 6A and 6B are flow diagrams illustrative of a color octree pruning sub-routine in accordance with the present invention.
Figure 6B:
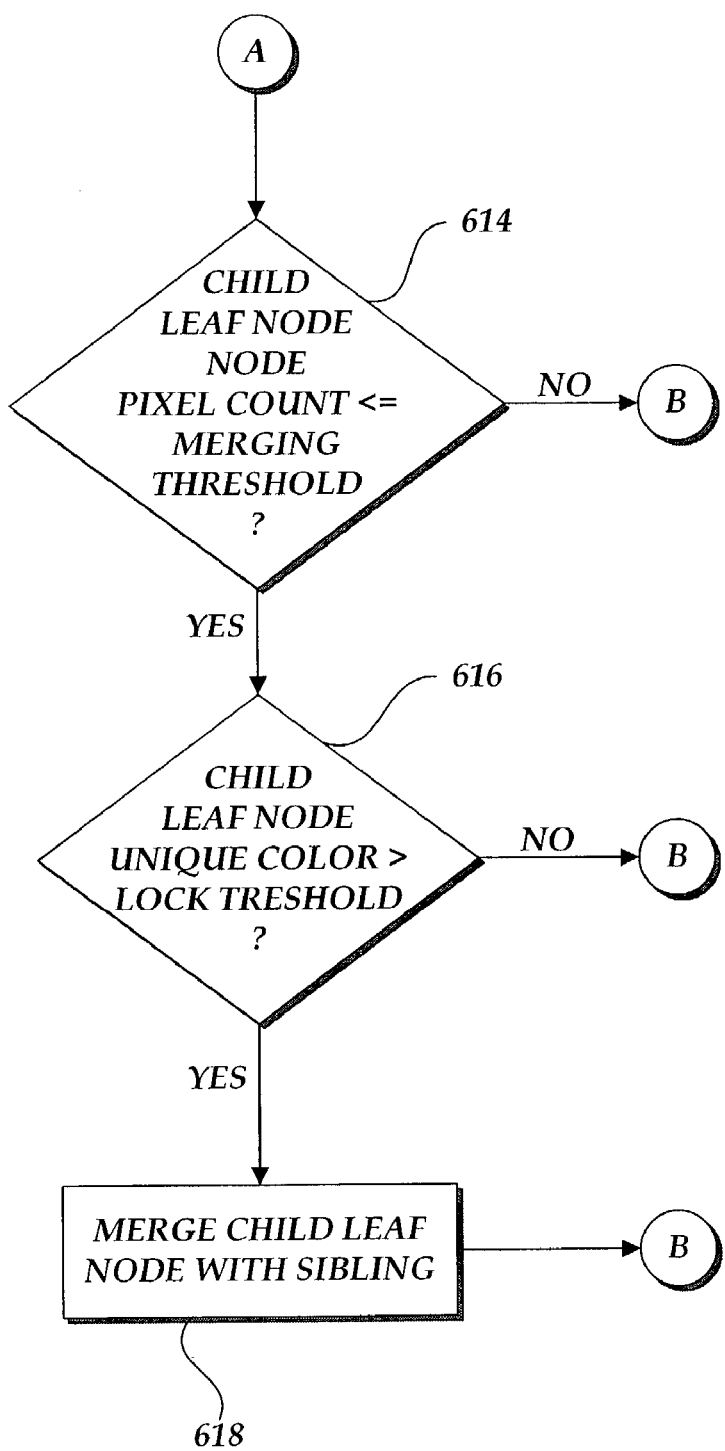

FIGS. 6A and 6B are flow diagrams illustrative of a pixel octree pruning sub-routine 600 in accordance with the present invention. In an illustrative embodiment of the present invention, sub-routine 600 represents a recursive process that begins by examining each node in the color octree through a depth-first analysis to reduce the number of leaf nodes in the octree. At block 602, the top most node in the octree is set as the current node to be examined, referred to as the current node. At block 604, the next descendant of the current node having at least one child node that is a leaf node is obtained. In an illustrative embodiment of the present invention, sub-routine 600 recursively iterates from the top most level in the octree to the subsequent levels in the octree to identify the next child node with at least one child node that will be processed as explained below. One skilled in the relative art will appreciate that each recursion through a higher level of the octree will eventually be processed.

At decision block 606, a test is conducted to determine whether the current node includes all child leaf nodes. If the current node has all child leaf nodes, at decision block 608, a test is conducted to determine whether the current node's pixel count is less than or equal to the current merging threshold. As explained above, in an illustrative embodiment of the present invention, each node in the octree includes the number of pixels passing through the node (e.g., the pixel count). Accordingly, decision block 608 is a straight mathematical comparison. In an alternative embodiment of the present invention, additional criteria may be utilized to provide a weighting function to the pixel count number.

If the current node's pixel count is not less than the current merging threshold, the sub-routine 600 proceeds to decision block 614 (FIG. 6B), which will be described below. If the current node's pixel count is less than the current merging threshold, at decision block 610, a test is conducted to determine whether the current node's unique color count is greater than the unique color lock threshold. In an illustrative embodiment of the present invention, each node further includes a unique color lock threshold that corresponds to second threshold that attempts to preserve unique colors in the octree that would otherwise be merged. The unique color lock threshold may be a pre-selected number or a dynamically calculated number based upon an evaluation of a color lock variable.

Figure 7:
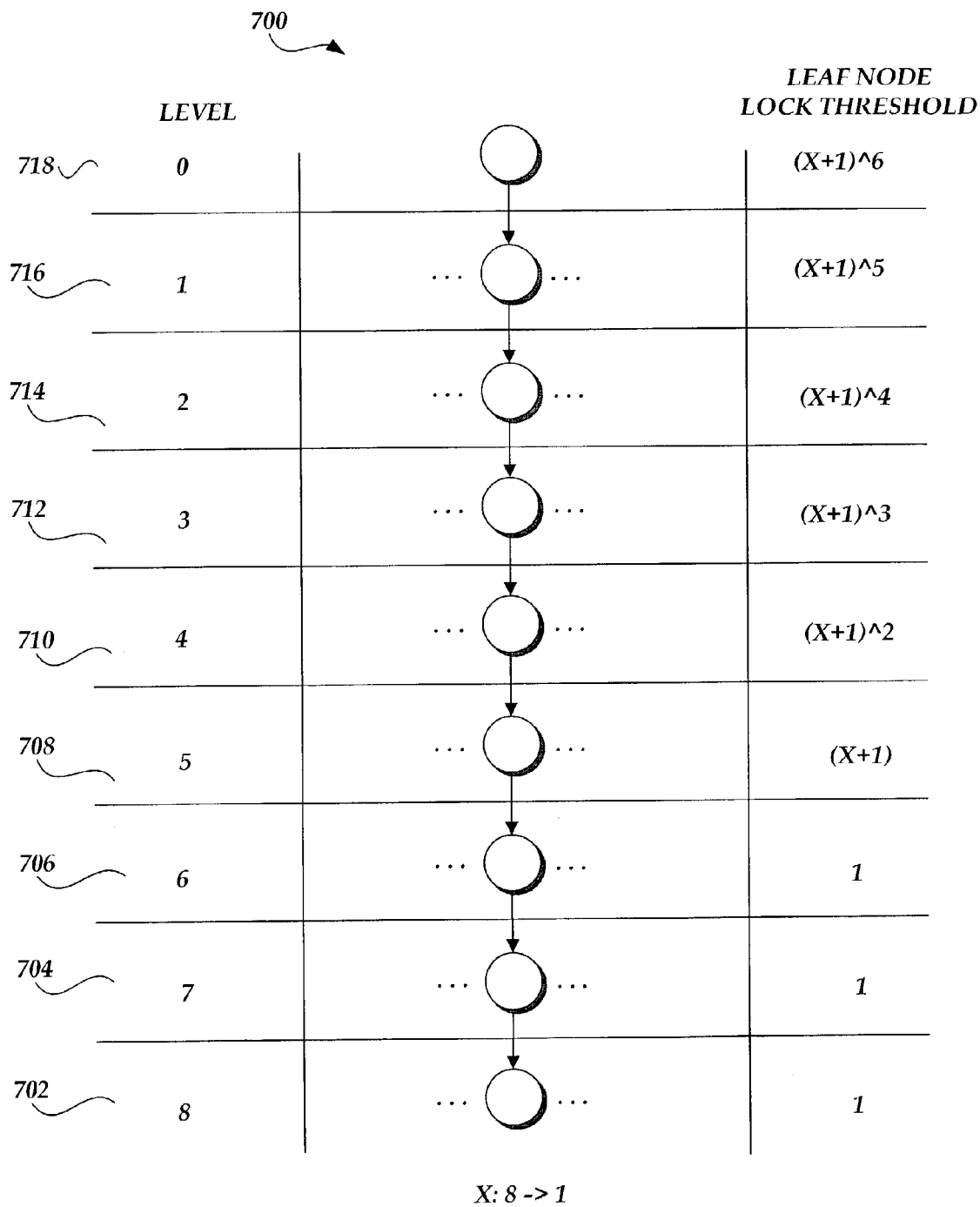
FIG. 7 is a block diagram illustrative of the leaf node lock threshold of a color octree according to a hierarchical level in accordance with the present invention.

FIG. 7 is block diagram the unique color lock threshold of various levels of a color octree 700. As illustrated in FIG. 7, the lower levels of the octree 702, 704 and 706 have fixed values for unique lock thresholds. The remaining levels of the octree 706–718 include an exponential of a color lock variable. For example, a unique color lock threshold corresponding to the base node would be calculated by evaluating the color lock variable to the fifth power. Thus, each unique color lock threshold become exponentially higher as the level of the node in the octree increases. As illustrated in FIG. 7, the color lock variable can correspond to a range of numbers from 8 to 1 that is adjusting downward during various iterations of routine 500 and sub-routine 600. Although FIG. 7 illustrates a combination of fixed values and dynamic values, one skilled in the relevant art will appreciate that all of the unique color lock thresholds may be predetermined fixed thresholds. Additionally, all of the unique color lock thresholds may be dynamically calculated by evaluating a color lock variable in a mathematical equation. Although a single mathematical equation is illustrated in FIG. 7, one skilled in the relevant art will appreciate that any number of mathematical equations may be utilized in accordance with the present invention.

Figure 8:
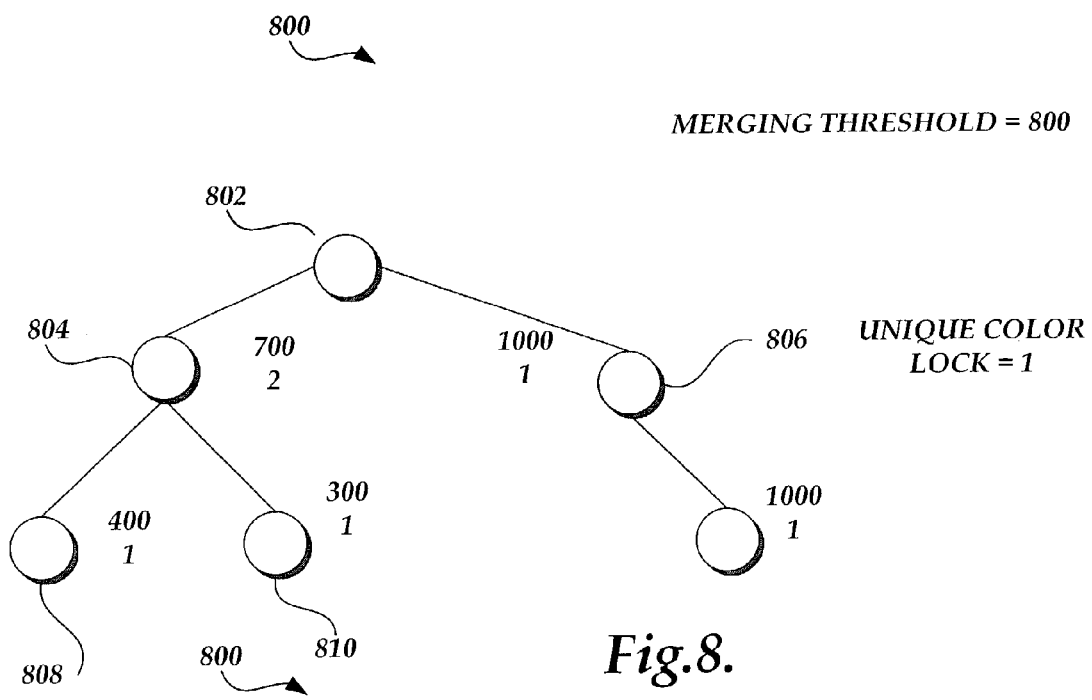
FIG. 8 is a block diagram illustrative of a color octree formed in accordance with the present invention.
Figure 9:
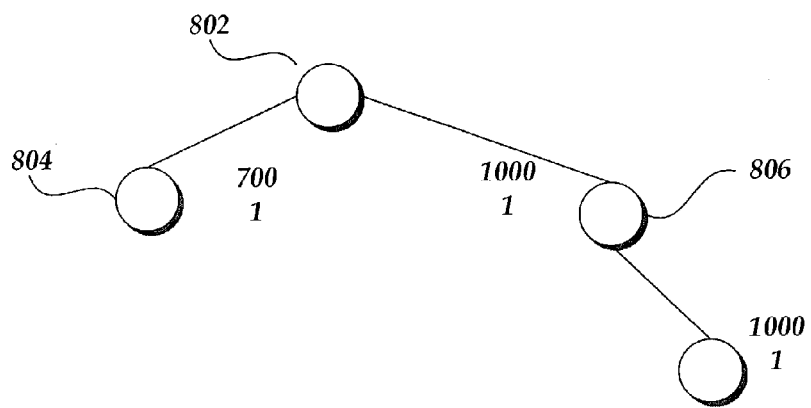
FIG. 9 is a block diagram of the color octree of FIG. 8 illustrating the optimization of the octree in accordance with the present invention.

Returning to FIG. 6A, if current node's unique color count is not greater than the color count threshold, the sub-routine 600 proceeds to decision block 614 (FIG. 6B), which will be described below. Alternatively, if current node's unique color count is greater than the color count threshold, at block 612, all of the current node's children are merged into the current node and the routine 600 proceeds to decision block 618, which will be described in greater detail below. FIG. 8 is a block diagram illustrative of a portion of a color octree 800 having a base node 802 with two children nodes 804 and 806. Further, child node 804 has two children 808 and 810. The pixel count and unique colors for each node is represented as numerals next to the node with pixel count as the topmost numeral. As illustrated in FIG. 8, the current merging threshold is 800 pixels and value of the unique color lock threshold for the child nodes 804 and 808 is 1. In accordance with decision blocks 608 and 610 and block 612, the pixel count for child node 804 is less than the merging threshold and the unique color count is greater than the unique color lock threshold. Accordingly, child nodes 808 and 810 are merged to the parent node 804. In contrast, child node 806 would not be merged because it has a pixel count greater than the merging threshold. FIG. 9 is a block diagram of octree 800 illustrating the results of the merger with node 804 as a leaf node. Note that the pixel count for node 804 has not changed, while the unique color count has changed as node 804 now represents only a single color.

Turning now to FIG. 6B, if the current node does not have all child nodes (decision block 606), does not have a pixel count less than or equal to the merging threshold (decision block 608), or does not have a unique color count greater than the color count threshold (decision block 610), at decision block 614, a test is conducted to determine whether the child node's pixel count is less than or equal to the current merging threshold. If the child node's pixel count is less than the current merging threshold, at decision block 616, a test is conducted to determine whether the child node's unique color count is greater than the color count threshold. If so, at block 618, the child node is merged into a sibling node and the routine 600 proceeds to decision block 618, which will be described in greater detail below.

Figure 10:
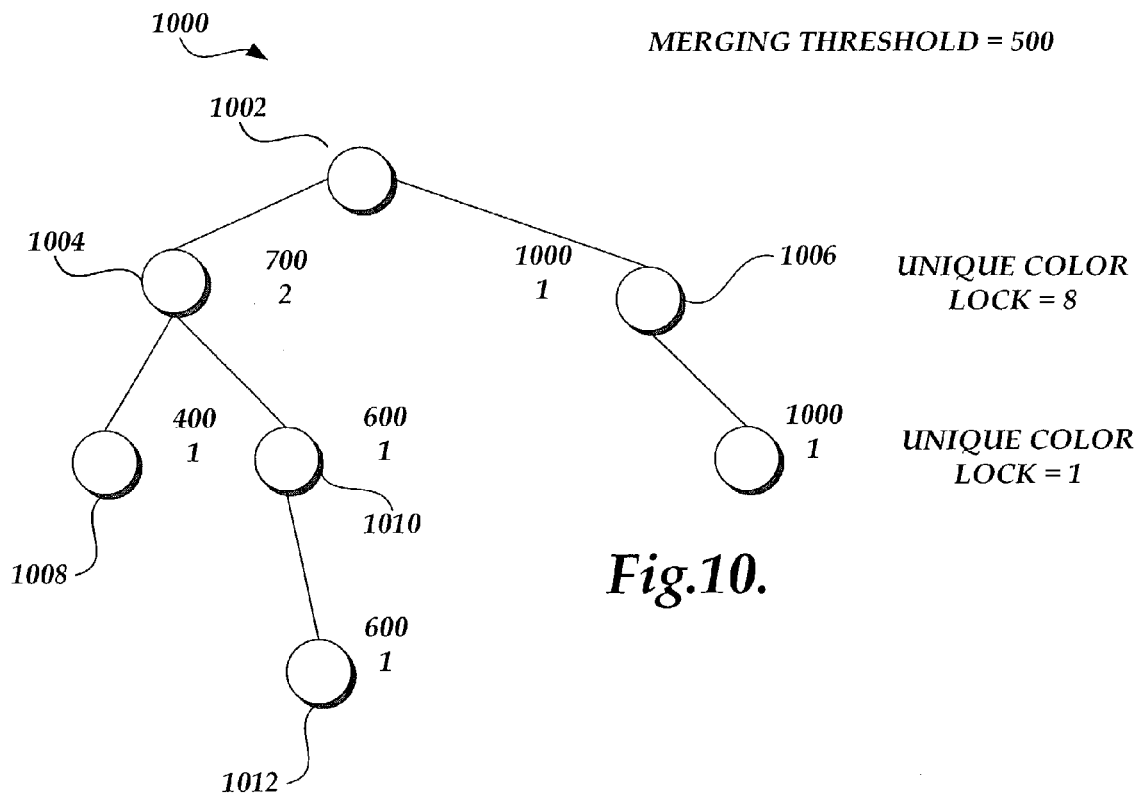
FIG. 10 is a block diagram illustrative of a color octree-illustrating the optimization of the octree in accordance with the present invention.
Figure 11:
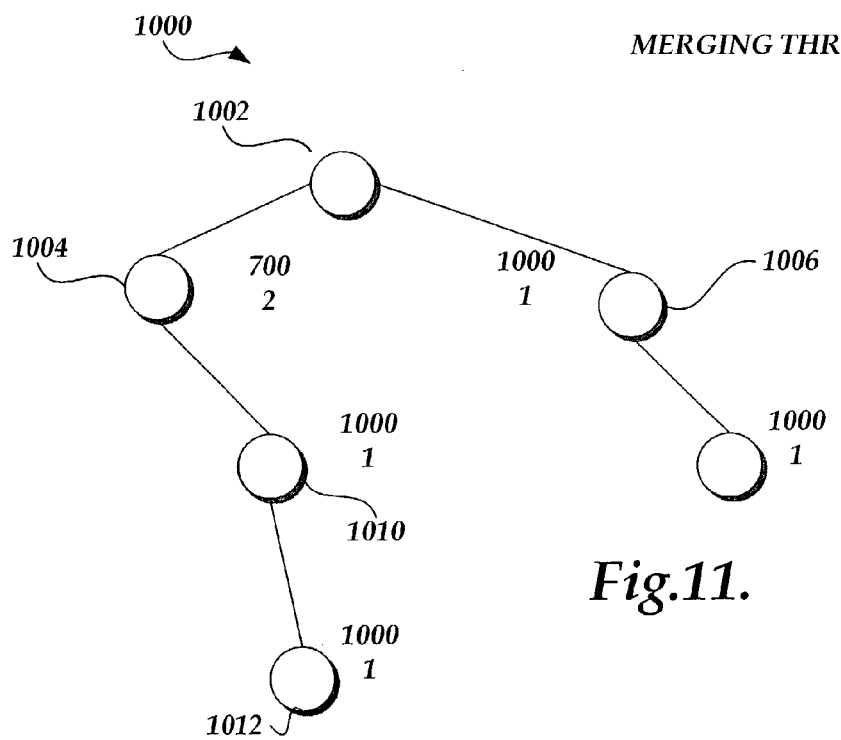
FIG. 11 is a block diagram of the color octree of FIG. 10 illustrating the optimization of the octree in accordance with the present invention.

FIG. 10 is a block diagram illustrative of a portion of a color octree 1000 having a base node 1002 with two children nodes 1004 and 1006. Additionally, child node 1004 has two children 1008 and 1010. Further, child node 1010 has a child node 1012. As illustrated in FIG. 10, the current merging threshold is 500 pixels and value of the unique color lock threshold for the child nodes 1004 and 1006 is 8 and the unique color lock threshold hold for child nodes 1008 and 1010 is 1. In accordance with decision blocks 614 and 616 and block 618, the pixel count for child node 1008 is less than the merging threshold and the unique color count is greater than the unique color lock threshold. Accordingly, child node 1008 is merged with its sibling node 1010. FIG. 11 is a block diagram of octree 1000 illustrating the results of the merger with node 1008 and node 1010. Note that the pixel count for node 1010 and node 1012 has changed to accommodate for the merged pixels of node 1008, while the unique color count has not changed.

Returning to FIG. 6A, at decision block 620, a test is conducted to determine whether the current node is the last node to be processed in the octree. If additional nodes remain, at block 622, the next node is obtained and set as the current node. In an illustrative embodiment of the present invention, the next node selected will depend on the recursive traversal of the octree. As each child node is processed, the recursive process selects the child's parent, processes the parent again, and then selects any siblings to process. Accordingly, in an illustrative embodiment of the present invention, sub-routine 600 starts with the top most node, traverses to the bottom most leaf nodes and then re-traverses back to the top most node. If no further nodes remain, at block 624, sub-routine 600 returns.

Turning now to FIG. 5B, once the pixel octree is pruned at block 512 (FIG. 5A), at decision block 514, a test is conducted to determine whether the number of leaf nodes exceeds the leaf node number threshold. If the leaf node number threshold is not exceeded, the unique leaf node colors can be mapped to the color palette at block 516 and the routine terminates. If the number of leaf nodes still exceeds the leaf node number threshold after the pruning, at decision block 518, a test is conducted to determine whether the number of leaf nodes has been reduced. If the number of leaf nodes has been reduced, at block 520, the pruning count is reset and the merging threshold is increased. The routine 500 returns to block 512 (FIG. 5A) to prune the octree again. In an illustrative embodiment of the present invention, because the merging threshold was successful in reducing the number of leaf nodes at the current unique color lock thresholds, the merging threshold will continue to be increased.

Alternatively, if the number leaf nodes was not reduced at decision block 518, at decision block 522, a test is conducted to determine whether the pruning count exceeds a pruning count threshold. In an illustrative embodiment of the present invention, the pruning count keeps track of the number of pruning iterations that have been conducted without a modification to the number of leaf nodes and will be utilized to determine when to adjust the unique color lock threshold. For example, in an illustrative embodiment of the present invention, the pruning count threshold may be set to ten pruning iterations. If the pruning count is below the pruning count threshold, at block 524, the merging threshold is increased and the pruning count is increased. In an illustrative embodiment of the present invention, the merging threshold may be incremented in pre-determined manner. The routine 500 returns to block 512 (FIG. 5A), where the pixel octree is pruned with the new merging thresholds. Returning to decision block 522, if the pruning count exceeds the threshold, at block 526, the unique color lock threshold is decreased and the merging threshold and pruning count are reset. The routine 500 returns to block 512 (FIG. 5A), where the pixel octree is pruned with the new merging and unique color lock thresholds. The routine 500 then continues until the number of leaf nodes is less than the leaf node number threshold.

In an illustrative embodiment of the present invention, once the color palette is created, images can be mapped according to the optimized color palette in which an original pixel color is approximated to one of the colors in the optimized color palette. Further, in another embodiment of the present invention, dithering techniques may be applied to the optimized color palette to mitigate perceived color error in mapping original color values to the optimized color palette.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for generating an optimized color palette having a target number of colors for a display comprised of a specification of color values for a plurality of pixels, wherein each pixel has a specific color value, the method comprising:
  (a) obtaining a color octree corresponding to a mapping of pixel color values, wherein the color octree includes a plurality of leaf nodes tracking a cumulative color value for a plurality of pixels in the display and wherein the color octree includes unique color lock thresholds for levels of the color octree;
  (b) for each node in the color octree having all children that are leaf nodes, determining whether the number of pixels tracked by a current node is less than a merging threshold;
  (c) if a number of pixels tracked by the current node is less than a merging threshold, determining whether a number of unique colors represented by the node is greater than a unique color lock threshold corresponding to the node;
  (d) if the number of unique colors represented by the current node is greater than the unique color lock threshold, merging all the child leaf nodes into the current node;
  (e) for each node in the color octree having at least one child that is a leaf node, determining whether the number of pixels tracked by a leaf node child is less than a merging threshold;
  (f) if a number of pixels tracked by the leaf node child is less than a merging threshold, determining whether a number of unique colors represented by the leaf node child is greater than a unique color lock threshold corresponding to the node;
  (g) if the number of unique colors represented by the leaf node child is greater than the unique color lock threshold, merging the leaf node child into a sibling node;

(h) increasing the merging threshold and repeating (a)–(d), until the number of leaf nodes is less than the target number of colors in the optimized color palette, and (i) if the number of leaf nodes is less than or equal to the target number of colors in the optimized color palette, generating a color palette corresponding to a mapping each remaining leaf node color value.

2. The method as recited in claim 1, wherein obtaining a color octree includes generating a color octree having a number of levels corresponding to the number of bits utilized to represent the color values for each pixel.

3. The method as recited in claim 1, wherein obtaining a color octree includes generating a color octree having a number of levels less than the number of bits utilized to represent the color values for each pixel.

4. The method as recited in claim 1, wherein the unique color lock threshold is a fixed number.

5. The method as recited in claim 1, wherein the unique color lock threshold is a dynamic number corresponding to an evaluation of a color lock variable.

6. The method as recited in claim 1 further comprising prior to generating the color palette, incrementing a count corresponding to the number of times the merging threshold has been increased if the number of leaf nodes is not reduced;

if the count exceeds a count threshold, adjusting the unique color lock threshold;

resetting the merging threshold; and repeating (a)–(d) according to the adjusted unique color lock threshold and the merging threshold.

7. The method as recited in claim 6, wherein the unique color lock threshold is a dynamic number corresponding to an evaluation of a color lock variable and wherein adjusting the unique color lock threshold includes adjusting the color lock variable.

8. The method as recited in claim 7, wherein the unique color lock threshold corresponds to an exponential function of the color lock variable.

9. The method as recited in claim 7, wherein the color lock variable corresponds to a decreasing range of numbers and wherein adjusting the leaf node lock threshold includes setting the color lock variable to the next number in the sequential range of numbers.

10. The method as recited in claim 1, wherein the pixel color values correspond to 24-bit RGB color values.

11. The method as recited in claim 1, wherein target number of colors in the color palette is 256.

12. A computer-readable medium having computer executable instructions for performing the method recited in claim 1.

13. A method for processing content requests, the method comprising:

(a) obtaining a content request including a request for display data corresponding to a specification of color values for a plurality of pixels, wherein each pixel has a specific color value;

(b) generating a color octree corresponding to a mapping of pixel color values, wherein the color octree includes a plurality of leaf nodes tracking a cumulative color value for a plurality of pixels in the display and wherein the color octree includes leaf node lock thresholds for levels of the color octree;

(c) for each node in the color octree having all children that are leaf nodes, determining whether a number of pixels tracked by a current node is less than a merging threshold;

(d) if the number of pixels tracked by the current node is less than a merging threshold, determining whether a number of unique colors represented by the current node is greater than a unique color lock threshold;

(e) if the number of unique colors represented by the current node is greater than a unique color lock threshold, merging all the child leaf nodes into the current node;

(f) for each node in the color octree having at least one child that is a leaf node, determining whether a number of pixels tracked by a leaf node child is less than a merging threshold;

(g) if the number of pixels tracked by the leaf node child is less than a merging threshold, determining whether a number of unique colors represented by the leaf node child is greater than a unique color lock threshold;

(h) if the number of unique colors represented by the leaf node child is greater than a unique color lock threshold, merging all the leaf node child into a sibling child node;

(i) increasing the merging threshold and repeating (a)–(d), until the number of leaf nodes is less than the target number of colors in the optimized color palette, (j) if the number of leaf nodes is less than or equal to the target number of colors in the optimized color palette, generating a color palette corresponding to a mapping each remaining leaf node color value;

(k) for each pixel in the display, mapping the original pixel color value to a color value in the color palette; and (l) transmitting the color palette and the mapped color display information in response to the content request.

14. The method as recited in claim 13, wherein generating a color octree includes generating a color octree having a number of levels corresponding to the number of bits utilized to represent the color values for each pixel.

15. The method as recited in claim 13, wherein generating a color octree includes generating a color octree having a number of levels less than the number of bits utilized to represent the color values for each pixel.

16. The method as recited in claim 13, wherein the unique color lock threshold is a fixed number.

17. The method as recited in claim 13, wherein the unique color lock threshold is a dynamic number corresponding to an evaluation of a color lock variable.

18. The method as recited in claim 13 further comprising prior to generating the color palette, incrementing a count corresponding to the number of times the merging threshold has been increased if the number of leaf nodes is not reduced;

if the count exceeds a count threshold, adjusting the unique color lock threshold;

resetting the merging threshold; and repeating (a)–(d) according to the adjusted unique color lock threshold and the merging threshold.

19. The method as recited in claim 18, wherein the leaf node lock threshold is a dynamic number corresponding to an evaluation of a color lock variable and wherein adjusting the leaf node lock threshold includes adjusting the color lock variable.

20. The method as recited in claim 19, wherein the leaf node lock threshold corresponds to an exponential function of the color lock variable.

21. The method as recited in claim 19, wherein the color lock variable corresponds to a decreasing range of numbers and wherein adjusting the leaf node lock threshold includes setting the color lock variable to the next number in the sequential range of numbers.

22. The method as recited in claim 13, wherein the pixel color values correspond to 24-bit RGB color values.

23. The method as recited in claim 13, wherein target number of colors in the color palette is 256.

24. A computer-readable medium having computer-executable instructions for performing the method recited in claim 13.

25. A method for generating an optimized color palette having a target number of colors for a display comprised of a specification of RGB color values for a plurality of pixels, wherein each pixel has a specific RGB color value, the method comprising:

(a) generating a color octree corresponding to a mapping of pixel color values, wherein the color octree includes a plurality of leaf nodes tracking a cumulative color value for a plurality of pixels in the display and wherein each leaf node includes a leaf node lock threshold corresponding to its position within the color octree;

(b) for each leaf node in the color octree having all children that are leaf nodes, determining whether the number of pixels tracked by a current node is less than a merging threshold;

(c) if a number of pixels tracked by the current node is less than a merging threshold, determining whether a number of unique colors represented by the current node is greater than a unique color lock threshold;

(d) if the number of unique colors represented by the current node is greater than the unique color lock threshold, merging all the child leaf nodes into the current node (e) for each leaf node in the color octree having at least one child leaf node, determining whether the number of pixels tracked by a leaf node child is less than a merging threshold;

(f) if a number of pixels tracked by the leaf node child is less than a merging threshold, determining whether a number of unique colors represented by the leaf node child is greater than a unique color lock threshold;

(g) if the number of unique colors represented by the leaf node child is greater than the unique color lock threshold, merging all the leaf node child into a sibling node;

(h) if the number of remaining leaf nodes is greater than the target number of colors in the optimized color palette and the number of leaf nodes does not change, increasing the merging threshold and a merging threshold count and repeating (a)–(d) until the merging threshold count is greater than a count threshold;

(i) adjusting the leaf node lock threshold and resetting the merging threshold; and (j) if the number of leaf nodes is less than or equal to the target number of colors in the optimized color palette, generating a color palette corresponding to a mapping each remaining leaf node color value.

26. The method as recited in claim 25, wherein generating a color octree includes generating a color octree having a number of levels corresponding to the number of bits utilized to represent the color values for each pixel.

27. The method as recited in claim 25, wherein generating a color octree includes generating a color octree having a number of levels less than the number of bits utilized to represent the color values for each pixel.

28. The method as recited in claim 25, wherein the unique color lock threshold is a fixed number.

29. The method as recited in claim 25, wherein the unique color lock threshold is a dynamic number corresponding to an evaluation of a color lock variable.

30. The method as recited in claim 29, wherein adjusting the leaf node lock threshold includes adjusting the color lock variable.

31. The method as recited in claim 30, wherein the unique color lock threshold corresponds to an exponential function of the color lock variable.

32. The method as recited in claim 31, wherein the color lock variable corresponds to a decreasing range of numbers and wherein adjusting the leaf node lock threshold includes setting the color lock variable to the next number in the sequential range of numbers.

33. The method as recited in claim 25, wherein the pixel color values correspond to 24-bit RGB color values.

34. The method as recited in claim 25, wherein target number of colors in the color palette is 256.

35. The method as recited in claim 25 further comprising obtaining a content request including a request for the display corresponding to a specification of color values for a plurality of pixels;

upon generating the color palette, for each pixel in the display, mapping the original pixel color value to a color value in the color palette; and transmitting the color palette and the mapped color display information in response to the content request.

36. A computer-readable medium having computer-executable instructions for performing the method recited in claim 25.

* * * * *